(12) United States Patent
Smith

(10) Patent No.: US 6,734,798 B2
(45) Date of Patent: May 11, 2004

(54) FUEL DISPENSER WITH A HUMAN DETECTION AND RECOGNITION SYSTEM

(76) Inventor: Ervin M. Smith, 530 N. 200 W., Monroe, IN (US) 46772

(*) Notice: Subject to any disclaimer, the term of this patent is extended or adjusted under 35 U.S.C. 154(b) by 93 days.

(21) Appl. No.: 10/062,067

(22) Filed: Jan. 31, 2002

(65) Prior Publication Data
US 2003/0144905 A1 Jul. 31, 2003

(51) Int. Cl.[7] .............................................. G08B 23/00
(52) U.S. Cl. ..................... 340/573.1; 340/5.2; 340/5.53; 340/5.83; 340/5.9; 340/5.91; 340/691.6; 141/94; 221/2; 221/8; 235/381; 235/382; 348/150; 348/161; 382/117; 382/118; 700/236
(58) Field of Search ............................ 340/573.1, 5.91, 340/565, 691.6, 566, 5.1, 5.2, 5.9, 5.53, 5.83; 235/375, 379, 381, 382, 383, 380; 382/118, 100, 103, 117, 116; 348/169, 222.1, 161, 150, 77; 700/236, 237, 231; 221/2–8; 345/133, 327, 24; 702/45; 705/413; 141/94, 95, 96, 98, 65, 66

(56) References Cited

U.S. PATENT DOCUMENTS

| | | |
|---|---|---|
| 4,449,189 A | 5/1984 | Feix et al. |
| 5,012,522 A * | 4/1991 | Lambert ..................... 382/118 |
| 5,134,716 A | 7/1992 | Craig |
| 5,412,738 A | 5/1995 | Brunelli et al. |
| 5,717,374 A | 2/1998 | Smith |
| 5,802,208 A | 9/1998 | Podilchuk et al. |
| 5,850,470 A | 12/1998 | Kung et al. |
| 5,914,654 A | 6/1999 | Smith |
| 5,945,975 A | 8/1999 | Lundrigan et al. |
| 5,991,429 A * | 11/1999 | Coffin et al. ................ 382/118 |
| 6,002,393 A | 12/1999 | Hite et al. |
| 6,018,293 A | 1/2000 | Smith |
| 6,061,658 A | 5/2000 | Chou et al. |
| 6,067,008 A | 5/2000 | Smith |
| 6,078,896 A | 6/2000 | Kaehler et al. |
| 6,098,879 A | 8/2000 | Terranova |
| 6,175,382 B1 * | 1/2001 | Mohr ......................... 348/150 |
| 6,380,853 B1 * | 4/2002 | Long et al. ................. 340/525 |
| 6,381,514 B1 * | 4/2002 | Hartsell, Jr. ................ 700/236 |
| 6,523,744 B2 * | 2/2003 | Royal, Jr. et al. .......... 235/381 |

* cited by examiner

*Primary Examiner*—Davetta W. Goins
(74) *Attorney, Agent, or Firm*—Fish & Richardson P.C.

(57) ABSTRACT

A fuel dispenser and method to detect the presence of a human being at a fuel dispenser as well as gather data about the human being using the fuel dispenser. The data is used to determine the language or dialect of the fueling instructions as well as the language or dialect of the advertisements understood by the human being. The data is also used to retrieve advertisements tailored to the human being. The fueling instructions and advertisements are displayed on the fuel dispenser in the language or dialect understood by the human being using the fuel dispenser.

35 Claims, 1 Drawing Sheet

FUEL DISPENSER WITH A HUMAN DETECTION AND RECOGNITION SYSTEM

BACKGROUND OF THE INVENTION

1. Field of the Invention

The present invention relates to a fuel dispenser and method to detect a customer at the fuel dispenser. Once the customer is detected, the fuel dispenser uses a video recognition device to collect appearance data from the customer. The fuel dispenser displays fueling instructions in the language or dialect understood by the customer as well as advertisements most appealing to the customer based on collected data.

2. Description of the Related Art

Fuel dispensers displaying particular advertisements based upon different criteria is well known in the art. Some fuel dispensers display advertisements based upon the time of day in which the customer is using the fuel dispenser. Some fuel dispensers display advertisements more personal to the customer through the use of a transponder or other wireless device wherein the customer enters personal data about themselves and the data is transferred to the fuel dispenser. The fuel dispenser displays advertisements based on the transferred personal data. A problem is that the customer may not have a wireless device or a transponder. Therefore, the advertisements are displayed based on generalized criteria rather than criteria that would be more appealing or tailored to the customer.

Another problem with many fuel dispensers is that they display instructions in one language and therefore a customer that does not read that language has difficulty understanding how to operate the fuel dispenser and purchase fuel for their vehicle. Even if the fuel dispenser displays the fueling instructions in the customers language, the customer may understand a different language or dialect than that displayed on the fuel dispenser and have a difficult time understanding the fueling instructions. What is needed is a fuel dispenser that displays fuel instructions and advertisements in the language or dialect understood by the customer, as well as, displaying advertisements that are most appealing to that customer. The present invention provides the solution to this need.

SUMMARY OF THE INVENTION

The present invention comprises, in one form thereof, a fuel dispenser with a human being detection and recognition system. The fuel dispenser has a sensor means for detecting the presence of a person at the fuel dispenser. Also, the fuel dispenser has a video recognition means for gathering appearance data of the person detected at the fuel dispenser. The appearance data can be used for one or more of retrieving the language or dialect to be used for displaying fueling instructions, retrieving the language or dialect to be used for displaying advertisements, retrieving an advertisement regardless of the language or dialect or retrieving the language or dialect for both the fueling instructions and the advertisements. The preferred embodiment utilizes the appearance data gathered from the video recognition means, the language or dialect to be used for displaying the fueling instructions and the advertisements is determined by a processor in the video recognition means. Once the language or dialect is determined, the fueling instructions are selected from a database in the language or dialect understood by the person at the fuel dispenser. Also, based upon the appearance data, advertisements in the language or dialect understood by the person at the fuel dispenser are selected from the database that would be most appealing to that person. Finally, the fueling instructions and advertisements are displayed at the fuel dispenser.

The present invention comprises, in another form thereof, a fuel dispenser with a human being detection and recognition system having a card reading means. The fuel dispenser has a sensor means for detecting the presence of a person at the fuel dispenser. Also, the fuel dispenser has a video recognition means for gathering appearance data of the person detected at the fuel dispenser. Utilizing the appearance data gathered from the video recognition means, the language or dialect to be used for displaying the fueling instructions and the advertisements is determined by a processor in the video recognition means. Once the language or dialect is determined, the fueling instructions are selected from a database in the language or dialect understood by the person at the fuel dispenser. Also, based upon the appearance data, advertisements in the language or dialect understood by the person at the fuel dispenser are selected from the database that would be most appealing to that person. Furthermore, a card reading means is located at the fuel dispenser for receiving a credit card. The fuel dispenser utilizes information from the credit card to gather financial data relating to the person and advertisements are selected from the database based upon the financial data derived from the credit card data. Finally, the fueling instructions and advertisements are displayed at the fuel dispenser.

The present invention comprises, in yet another form thereof, a method of detecting and recognizing a human being at a fuel dispenser. The fuel dispenser detects the presence of a person using a sensing means. Appearance data of the person detected at the fuel dispenser is gathered using a video recognition means. Utilizing the gathered appearance data, the advertisements and/or instructions are displayed to the person at the fuel dispenser.

An advantage of the present invention is that the fuel dispenser will display fueling instructions, payment instructions and advertisements in the language or dialect understood by the customer so that the customer will be able to easily understand all text displayed on the fuel dispenser display.

Another advantage of the present invention is that the fuel dispenser will display advertisements that are tailored and more appealing to the customer using the fuel dispenser.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
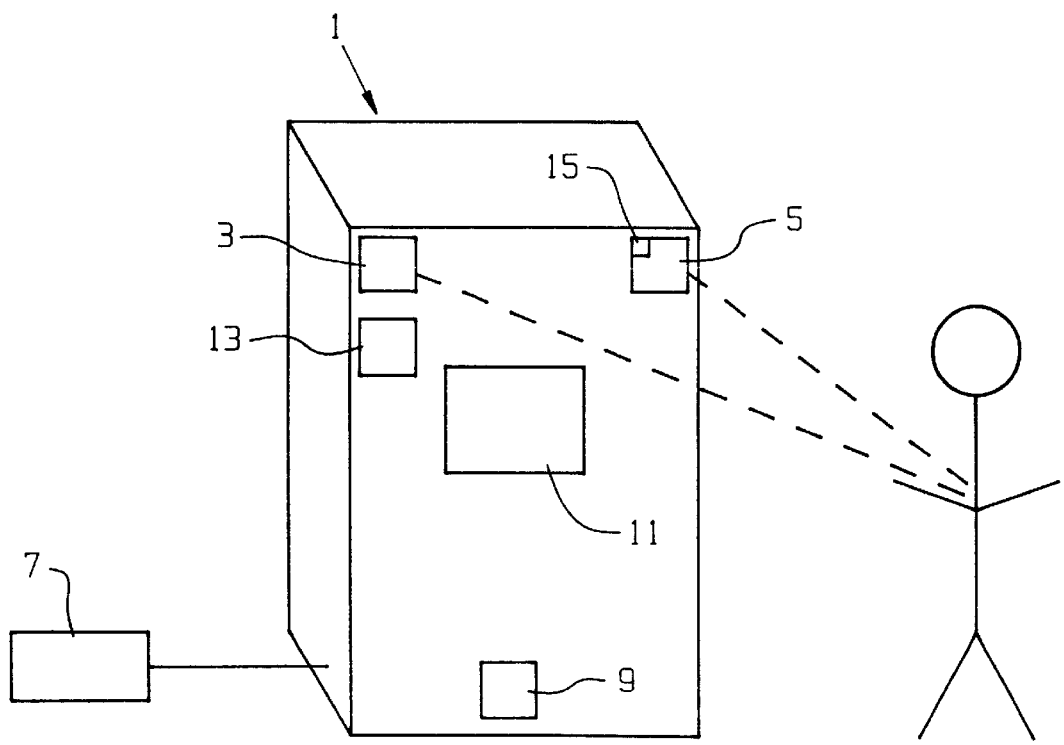
FIG. 2 is a diagrammatic view of one embodiment of the present invention.

Referring now to the drawings and particularly to FIG. 2, there is shown a fuel dispenser 1 with a human being detection and recognition system. The fuel dispenser 1 has a sensor means 3 used to detect the presence of a person at the fuel dispenser 1. The sensor means 3 is a conventional motion detector but other types of sensors that can detect the presence of a person at the fuel dispenser 1 can be used.

Once the presence of a person at the fuel dispenser 1 is detected, a fuel dispenser controller activates a video recognition means 5. Located on the fuel dispenser 1, the video recognition means 5 is used to gather appearance data of the person detected by the sensor means 3 at the fuel dispenser 1.

The video recognition means 5 uses a video camera to capture an image of the person's entire body. A digital camera or other digital image capturing device could be used. The image captured by the video recognition means 5 does not have to be of the entire body of the person, but the preferred embodiment is to capture an image of the entire body of the person. The video recognition means 5 has a processor 15 used to analyze the image and based upon that analysis, classifies the person and/or image into different categories. The processor 15 could be located at a remote location as well.

The database 7 includes the pixel color arrangement representing different human features. When processor 15 begins to analyze the image, processor 15 separates the image into different regions. The processor 15 then analyzes each region to determine the pixel color arrangement for each region. After the pixel color arrangement for each region has been determined by the processor 15, the processor 15 compares the pixel color arrangement for each region with the database 7 to find the closest match relating to different human features. Upon the processor 15 computing the closest match with different human features, the image is classified into different human feature categories. Also, the geographic location of the fuel dispenser 1 is a factor that the processor 15 uses to determine which human feature categories are most applicable to the image.

One of the categories is the language or dialect understood by the person using the fuel dispenser 1. A broader category could be the language understood by the person using the fuel dispenser 1 but the preferred embodiment would be the language or dialect understood by the person using the fuel dispenser 1. Some examples of languages or dialects are Highlands German, Lowlands German, Mandarin, Cantonese, American English and Australian English. This is a very small list of languages or dialects. Any and all languages or dialects may be included in this category.

Another category is the country of origin of the person. Some examples would be the United States, India, Mexico, Japan and China. Any and all countries of origin may be included in this category.

Other categories include, but are not limited to, the height of the person, the weight of the person, the gender of the person as well as the age range for which the person may fall within. Furthermore, one category is whether the person at the fuel dispenser 1 is handicapped. An example would be if the person is in a wheelchair. The video recognition means 5 captures the image of the person in the wheelchair and once the processor 15 analyzes the image and determines that the person is in a wheelchair, the fuel dispenser controller sends a signal to the fueling station to alert a station worker that the person at the fuel dispenser 1 requires assistance.

The fuel dispenser 1 is associated with the database 7 which also includes fueling instructions and advertisements in addition to the different human features stored in the database 7. The database 7 can include fueling instructions, advertisements or a combination of fueling instructions and advertisements. The database 7 can either be located within the fuel dispenser 1 or can be communicatively connected to the fuel dispenser 1 using a network. The preferred embodiment has the fuel dispenser 1 connected to the database 7 using an electronic or fiberoptic network connection. The database 7 is located in a computer, such as an IBM compatible computer with a 400 mhz processor, and the computer is located in the fueling station. The database 7 could also be in a computer at a remote location.

The fueling instructions are categorized by language or dialect within the database 7. Some examples of fueling instructions are selecting the grade of fuel to be dispensed, lifting the nozzle from the nozzle cradle so that the nozzle can be inserted into the vehicle, choosing whether to pay inside or at the fuel dispenser 1 and any other fueling instruction desired to be displayed by the fueling station. Once the video recognition means 5 determines the language or dialect of the person using the fuel dispenser 1, a fuel dispenser controller 9 uses the language or dialect information to retrieve the proper fueling instructions from the database 7 for display on the fuel dispenser 1. The fuel dispenser controller 9 transfers data bi-directionally between the fuel dispenser 1, sensor means 3, video recognition means 5, display 11, and the database 7. The display 11 does not need to be on the fuel dispenser 1 but the preferred embodiment has the display 11 on the fuel dispenser 1. Once the language or dialect category has been retrieved from the database 7, the fueling station instructions are transferred to the fuel dispenser display 11 by the fuel dispenser controller 9 and the fueling instructions are displayed to the person using the fuel dispenser 1.

Once the language or dialect for the fueling instructions has been determined by the video recognition means 5, the fuel dispenser 1 uses other categories to select advertisements from the database 7. The advertisements may be categorized by language or dialect within database 7. Within the language or dialect categories of the database 7, the advertisements are further categorized by age range, height, weight, gender as well as handicapped status. This list and organization of categories and characteristics is not limiting and any category or characteristic may be used. The fuel dispenser controller 9 uses the language or dialect category as well as the other sub-categories of the language or dialect category to retrieve advertisements from the database 7. The advertisements are retrieved from the category of the language or dialect of the person and within that language or dialect category, the applicable subcategories of advertisements. The advertisements are sent from the fuel dispenser controller 9 to the fuel dispenser display 11 for the person using the fuel dispenser 1 to view. Therefore, if the language or dialect is determined to be American English, the categories of advertisements that will be displayed on the fuel dispenser 1 would be in American English.

The fuel dispenser 1 can use the appearance data for retrieving fueling instructions and/or advertisements without using the language or dialect category. The fuel dispenser 1 can use the appearance data for retrieving fueling instructions without retrieving any advertisements as well as retrieving advertisements without retrieving any fueling instructions. Furthermore, the fuel dispenser 1 can use the appearance data for retrieving advertisements first and then retrieving the fueling instructions. Also, the fuel dispenser 1 can utilize any combination of categories when determining which advertisements to retrieve. An example would be determining the gender of the person at the fuel dispenser 1 and once the gender is determined, using the weight category to retrieve an appropriate advertisement.

Once the fueling transaction is complete, the sensor means 3 as well as the video recognition means 5 are reset so that once the next customer approaches, the process begins again. The fueling transaction is complete upon the return of the fueling nozzle to the fueling nozzle cradle by the person using the fuel dispenser 1.

Another form of the present invention is a fuel dispenser 1 with a human being detection and recognition system that includes a card reading means 13 for receiving a credit card for payment. A fuel dispenser 1 has a sensor means 3 used to detect the presence of a person at the fuel dispenser 1. The sensor means 3 is a motion detector but other sensor means 3 that can detect the presence of a customer at the fuel dispenser 1 can be used.

Once the presence of a person at the fuel dispenser 1 is detected, a fuel dispenser controller 9 activates a video recognition means 5 located on fuel dispenser 1. The video recognition means 5 is used to gather appearance data of the person detected by the sensor means 3 at the fuel dispenser 1.

The video recognition means 5 uses a video camera to capture an image of the person's entire body. The video recognition means 5 has a processor 15 used to analyze the image and based upon that analysis, classifies the person into different categories. One of the categories is the language or dialect understood by the person using the fuel dispenser 1. Some languages or dialects are Highlands German, Lowlands German, Mandarin, Cantonese, American English and Australian English. Another category would be the country of origin of the person.

Other possible categories include, but are not limited to, the height of the person, the weight of the person, the gender of the person as well as age the range for which the person may fall within. Furthermore, another category is whether the person at the fuel dispenser 1 is handicapped.

The fuel dispenser 1 is associated with a database 7 of fueling instructions and advertisements. The database 7 can either be located within the fuel dispenser 1 or can be communicatively connected to the fuel dispenser 1 using a network. The preferred embodiment has the fuel dispenser 1 connected to the database 7 using a network connection. The database 7 is located in a computer and the computer is located in the fuel station. The database 7 could also be in a computer at a remote location.

The fueling instructions are categorized by language or dialect within the database 7. Some examples of fueling instructions are selecting the grade of fuel to be dispensed, lifting the nozzle from the nozzle cradle so that the nozzle can be inserted into the vehicle, choosing whether to pay inside or at the fuel dispenser and any other fueling instruction desired to be displayed by the fueling station. Once the video recognition means 5 determines the language or dialect of the person using the fuel dispenser, the fuel dispenser controller 9 uses the language or dialect information to retrieve the proper fueling instructions from the database 7 for display on the fuel dispenser 1. The fuel dispenser controller 9 transfers data bi-directionally between the fuel dispenser 1, sensor means 3, video recognition means 5, database 7, display 11 and card reading means 13. Once the language or dialect category has been retrieved from the database 7, the fueling instructions are transferred to the fuel dispenser display 11 by the fuel dispenser controller 9 and the fueling instructions are displayed to the person using the fuel dispenser 1.

Once the language or dialect for the fueling instructions has been determined by the video recognition means 5, the fuel dispenser 1 uses the other categories to select advertisements from the database 7. The advertisements are categorized by language or dialect within database 7. Within the language or dialect categories of the database 7, the advertisements are further categorized by age range, height, weight, gender as well as handicapped status. This list of categories is not limiting and any category may be used. The fuel dispenser uses the language or dialect category as well as the other sub-categories of the language or dialect category to retrieve the advertisements from the database 7. The advertisements are retrieved from the category of the language or dialect of the person and within that language or dialect category, the applicable subcategories of advertisements. The advertisements are sent from the fuel dispenser controller 9 to the fuel dispenser display 11 for the person using the fuel dispenser 1 to view. Therefore, if the language or dialect is determined to be Highlands German, the categories of advertisements that will be displayed on the fuel dispenser 1 would be in Highlands German.

A card reading means 13 is located at the fuel dispenser 1. The card reading means 13 can be used to read different types of cards such as credit cards, debit cards, a drivers license as well as other types of cards. Based on the card data, the fuel dispenser controller 9 retrieves advertisements to be displayed on the fuel dispenser 1. Furthermore, the card reading means 13 can use the card data to gather more data about the person and based on that gathered data, the fuel dispenser controller 9 retrieves advertisements to be displayed on the fuel dispenser 1. An example is if the person at the fuel dispenser 1 is paying for the fuel with a credit card, while the credit payment authorization system checks to ensure that a person has enough money available on their credit card to pay for the fueling transaction, the card reading means gathers financial data, such as the remaining balance on the credit card, to use as criteria in selecting advertisements for the person at the fuel dispenser 1. An example would be if the person has a low credit limit with the balance on the credit card being very close to the credit limit, an advertisement for less expensive items or a credit consolidation advertisement would be retrieved. The advertisements are then displayed on the fuel dispenser 1.

Once the fueling transaction is complete, the sensor means 3, as well as, the video recognition means 5 are reset so that once the next customer approaches, the process begins again. The fueling transaction is complete upon the return of the fueling nozzle to the fueling nozzle cradle by the person using the fuel dispenser 1.

Figure 1:
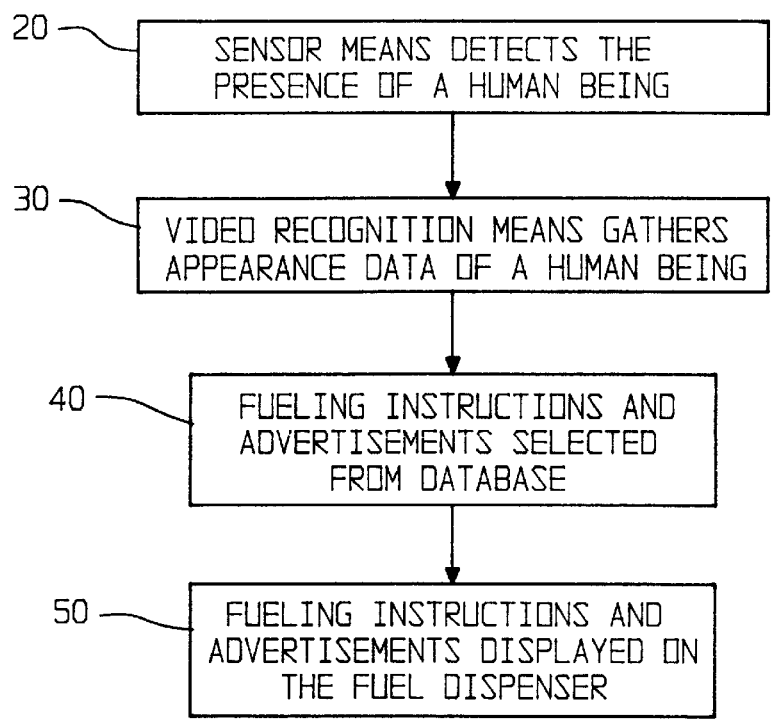
FIG. 1 is a flowchart of one embodiment of the present invention.

Another form of the present invention, as shown in FIG. 1, is a method of detecting and recognizing a human being at a fuel dispenser. A fuel dispenser has a sensor means used to detect the presence of a person (20) at the fuel dispenser. The sensor means is a motion detector but other sensor means that can detect the presence of a customer at the fuel dispenser can be used.

Once the presence of a person at the fuel dispenser 1 is detected, a fuel dispenser controller activates a video recognition means 5 located on fuel dispenser 1. The video recognition means is used to gather appearance data of the person (30) detected by the sensor means at the fuel dispenser.

The video recognition means uses a video camera to capture an image of the person's entire body. The video recognition means has a processor used to analyze the image and based upon that analysis, classifies the customer into different categories. One of the categories is the language or dialect understood by the person using the fuel dispenser. Some examples of languages or dialects are Highlands German, Lowlands German, Mandarin, Cantonese, American English and Australian English. Another category would be the country of origin of the person.

Other categories include, but are not limited to, the height of the person, the weight of the person, the gender of the person as well as age the range for which the person may fall within. Furthermore, one category is whether the person at the fuel dispenser is handicapped.

The fuel dispenser is associated with a database of fueling instructions and advertisements. The database can either be located within the fuel dispenser or can be communicatively connected to the fuel dispenser using a network. The preferred embodiment has the fuel dispenser connected to the database using a network connection. The database is located in a computer and the computer is located in the fuel station. The database could also be in a computer at a remote location.

The fueling instructions are categorized by language or dialect within the database. Some examples of fueling instructions are selecting the grade of fuel to be dispensed, lifting the nozzle from the nozzle cradle so that the nozzle can be inserted into the vehicle, choosing whether to pay inside or at the fuel dispenser and any other fueling instruction desired to be displayed by the fueling station. Once the video recognition means determines the language or dialect of the person using the fuel dispenser, the fuel dispenser controller uses the language or dialect information to retrieve the proper fueling instructions from the database (40) for display on the fuel dispenser. Once the language or dialect category has been retrieved from the database, the fueling instructions are transferred to the fuel dispenser display by the fuel dispenser controller and the fueling instructions are displayed (50) to the person using the fuel dispenser.

Once the language or dialect has been determined for the fueling instructions by the video recognition means, the fuel dispenser uses the other categories to select advertisements from the database. The advertisements are categorized by language or dialect within database. Within the language or dialect categories of the database, the advertisements are further categorized by age range, height, weight, gender as well as handicapped status. This list of categories is not limiting and any category may be used. The fuel dispenser controller uses the language or dialect category as well as the other sub-categories of the language or dialect category to retrieve the advertisements from the database (40). The advertisements are retrieved from the category of the language or dialect of the person and within that language or dialect category, the applicable subcategories of advertisements. The advertisements are sent from the fuel dispenser controller to the fuel dispenser (40) display for the person using the fuel dispenser (50) to view. Therefore, if the language or dialect is determined to be Mandarin, the categories of advertisements that will be displayed on the fuel dispenser would be in Mandarin.

Once the fueling transaction is complete, the sensor means, as well as, the video recognition means are reset so that once the next customer approaches, the process begins again. The fueling transaction is complete upon the return of the fueling nozzle to the fueling nozzle cradle by the person using the fuel dispenser.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A human being detection and recognition system for a fuel dispenser comprising:
   a fuel dispenser;
   a database of at least one of advertisements and instructions with said fuel dispenser, each said at least one of advertisements and instructions having a displayable format;
   a sensor means for detecting the presence of a person at said fuel dispenser;
   a video recognition means for gathering appearance data of the person detected at said fuel dispenser;
   a display means for displaying said at least one of advertisements and instructions; and
   a fuel dispenser controller for bi-directional communication between said database, said video recognition means, and said display means, wherein said fuel dispenser controller retrieves at least one of advertisements and instructions from said database determined by utilizing appearance data from said video recognition means.

2. The human being detection and recognition system for a fuel dispenser as recited in claim 1, further comprising a card reading means located at said fuel dispenser and in bi-directional communication with said fuel dispenser controller, for receiving a card and gathering data from the card and said fuel dispenser controller retrieves an advertisement based on the data gathered from the card.

3. The human being detection and recognition system for a fuel dispenser as recited in claim 2, wherein the card data is utilized to gather data relating to the person and said fuel dispenser controller retrieves an advertisement based on the gathered data relating to the person.

4. The human being detection and recognition system for a fuel dispenser as recited in claim 1, wherein the advertisements are composed in at least one dialect.

5. The human being detection and recognition system for a fuel dispenser as recited in claim 1, wherein the appearance data includes the country of the origin of the person.

6. The human being detection and recognition system for a fuel dispenser as recited in claim 1, wherein the appearance data includes a range for the age of the person.

7. The human being detection and recognition system for a fuel dispenser as recited in claim 1, wherein the appearance data includes the height of the person.

8. The human being detection and recognition system for a fuel dispenser as recited in claim 1, wherein the appearance data includes the weight of the person.

9. The human being detection and recognition system for a fuel dispenser as recited in claim 1, wherein the appearance data includes an indicator of handicapped status of the person.

10. The human being detection and recognition system for a fuel dispenser as recited in claim 1, wherein the appearance data includes the gender of the person.

11. The human being detection and recognition system for a fuel dispenser as recited in claim 1, wherein the instructions are composed in at least one dialect.

12. The human being detection and recognition system for a fuel dispenser as recited in claim 11, wherein the instructions include fuel purchasing options.

13. A human being detection and recognition system for a fuel dispenser comprising:

a fuel dispenser;

a database of at least one of advertisements and instructions with said fuel dispenser, each said at least one of advertisements and instructions having a displayable format;

a sensor means for detecting the presence of a person at said fuel dispenser;

a video recognition means for gathering appearance data of the person detected at said fuel dispenser;

a card reading means located at said fuel dispenser for receiving a card and gathering data from the card;

a display means for displaying said at least one of advertisements and instructions; and a fuel dispenser controller for bi-directional communication between said database, said video recognition means, said card reading means and said display means wherein said fuel dispenser controller retrieves at least one of advertisements and instructions from said database determined by utilizing at least one of the appearance data from said video recognition means and the card data from said card reading means.

14. The human being detection and recognition system for a fuel dispenser as recited in claim 13, wherein the card data is utilized to gather data relating to the person and said fuel dispenser controller retrieves an advertisement based on the gathered data relating to the person.

15. The human being detection and recognition system for a fuel dispenser as recited in claim 13, wherein the advertisements are composed in at least one dialect.

16. The human being detection and recognition system for a fuel dispenser as recited in claim 13, wherein the appearance data includes the country of the origin of the person.

17. The human being detection and recognition system for a fuel dispenser as recited in claim 13, wherein the appearance data includes a range for the age of the person.

18. The human being detection and recognition system for a fuel dispenser as recited in claim 13, wherein the appearance data includes the height of the person.

19. The human being detection and recognition system for a fuel dispenser as recited in claim 13, wherein the appearance data includes the weight of the person.

20. The human being detection and recognition system for a fuel dispenser as recited in claim 13, wherein the appearance data includes an indicator of handicapped status of the person.

21. The human being detection and recognition system for a fuel dispenser as recited in claim 13, wherein the appearance data includes the gender of the person.

22. The human being detection and recognition system for a fuel dispenser as recited in claim 13, wherein the instructions are composed in at least one dialect.

23. The human being detection and recognition system for a fuel dispenser as recited in claim 22, wherein the instructions include fuel purchasing options.

24. A method of detecting and recognizing a human being at a fuel dispenser comprising:

detecting the presence of a person at a fuel dispenser using sensing means;

gathering appearance data of the person detected at said fuel dispenser using a video recognition means; and displaying at least one of advertisements and instructions at raid fuel dispenser based on said gathered appearance data.

25. The method of detecting and recognizing a human being at a fuel dispenser as recited in claim 24, further comprising gathering data from a card using a card reading means at said fuel dispenser and displaying advertisements at said fuel dispenser based on the card data.

26. The method of detecting and recognizing a human being at a fuel dispenser as recited in claim 25, further comprising gathering data relating to the person utilizing the card data and displaying advertisements at said fuel dispenser based on the gathered data relating to the person.

27. The method of detecting and recognizing a human being at a fuel dispenser as recited in claim 24, wherein the advertisements are composed in at least one dialect.

28. The method of detecting and recognizing a human being at a fuel dispenser as recited in claim 24, wherein the appearance data includes the country of the origin of the person.

29. The method of detecting and recognizing a human being at a fuel dispenser as recited in claim 24, wherein the appearance data includes a range for the age of the person.

30. The method of detecting and recognizing a human being at a fuel dispenser as recited in claim 24, wherein the appearance data includes the height of the person.

31. The method of detecting and recognizing a human being at a fuel dispenser as recited in claim 24, wherein the appearance data includes the weight of the person.

32. The method of detecting and recognizing a human being at a fuel dispenser as recited in claim 24, wherein the appearance data includes an indicator of handicapped status of the person.

33. The method of detecting and recognizing a human being at a fuel dispenser as recited in claim 24, wherein the appearance data includes the gender of the person.

34. The method of detecting and recognizing a human being at a fuel dispenser as recited in claim 24, wherein the instructions are composed in at least one dialect.

35. The method of detecting and recognizing a human being at a fuel dispenser as recited in claim 34, wherein the instructions include fuel purchasing options.

* * * * *

UNITED STATES PATENT AND TRADEMARK OFFICE
CERTIFICATE OF CORRECTION

PATENT NO. : 6,734,798 B2
DATED : May 11, 2004
INVENTOR(S) : Ervin M. Smith

It is certified that error appears in the above-identified patent and that said Letters Patent is hereby corrected as shown below:

Column 10,
Line 14, replace "raid" with -- said --

Signed and Sealed this

Ninth Day of August, 2005

JON W. DUDAS
*Director of the United States Patent and Trademark Office*